US006525543B1

(12) United States Patent
Roberts et al.

(10) Patent No.: US 6,525,543 B1
(45) Date of Patent: Feb. 25, 2003

(54) FAULT TYPE SELECTION SYSTEM FOR IDENTIFYING FAULTS IN AN ELECTRIC POWER SYSTEM

(75) Inventors: Jeffrey B. Roberts, Viola, ID (US); Demetrios Tziouvaras, Vacaville, CA (US)

(73) Assignee: Schweitzer Engineering Laboratories, Pullman, WA (US)

( * ) Notice: Subject to any disclaimer, the term of this patent is extended or adjusted under 35 U.S.C. 154(b) by 0 days.

(21) Appl. No.: 09/693,607

(22) Filed: Oct. 20, 2000

(51) Int. Cl.$^7$ .................. G01R 31/08; G01R 31/00; H02H 3/38
(52) U.S. Cl. ........................... 324/522; 702/59
(58) Field of Search .................. 324/509, 525, 324/520, 521, 512, 522, 86, 107, 108; 702/59, 58

(56) References Cited

U.S. PATENT DOCUMENTS 5,796,258 A * 8/1998 Yang .................. 342/521
6,256,592 B1 * 7/2001 Roberts et al. .......... 324/512

* cited by examiner

Primary Examiner—Christine Oda
Assistant Examiner—James Kerveros
(74) Attorney, Agent, or Firm—Jensen & Puntigam, P.S.

(57) ABSTRACT

The fault identification system includes a first logic circuit which is responsive to conventional protective elements which recognize the presence of low resistance single line-to-ground faults for the A, B and C phases on a power transmission line. The first logic circuit includes a portion thereof for recognizing and providing an output indication of single line-to-ground faults, faults involving two phases and three-phase faults, in response to the occurrence of different combinations of outputs from the protective elements. A calculation circuit, when enabled, is used to determine the angular difference between the total zero sequence current and the total negative sequence current for high resistance faults when the protective elements themselves cannot identify fault conditions. The angular difference is in one of three pre-selected angular sectors. An angular difference in the first sector indicates an A phase-to-ground fault or a BC phase-to-phase to ground fault; an angular difference in the second sector indicates a B phase-to-ground fault or a C phase-to-phase to ground fault; and a signal in the third sector indicates a C phase-to-ground fault or an AB phase-to-phase to ground fault. A processor is used to determine which of the two possible for each angle determination is the actual fault type. An output indication of the actual fault type is then provided.

21 Claims, 6 Drawing Sheets

+ = Positive-Sequence Network
− = Negative-Sequence Network
0 = Zero-Sequence Network A-PHASE- GND. FAULT @ m=0.95, NO LOAD FLOW (δ= 0°), R, =0Ω

| CURRENT | RELAY 1 | RELAY 2 | TOTAL |
|---|---|---|---|
| $I_A$ | 4.63 A∠-90° | 28.46 A∠-90° | 33.09 A∠-90° |
| $I_B$ | 0 | | 0 |
| $I_C$ | 0 | | 0 |
| $I_{ABT}$ | - | - | 33.09 A∠-90° |
| $I_{BCT}$ | - | - | 0 |
| $I_{CAT}$ | - | - | 33.09 A∠-90° |
| $I_1$ | 4.63 A∠-90° | 28.46 A∠-90° | 33.09 A∠-90° |
| $I_2$ | 4.63 A∠-90° | 28.46 A∠-90° | 33.09 A∠-90° |
| $I_3$ | 4.63 A∠-90° | 28.46 A∠-90° | 33.09 A∠-90° |

FIG.3A

A-PHASE- GND. FAULT @ m=0.95, PRE-FAULT LOAD FLOW 5.08 A (δ= 45°), R, =30Ω

| CURRENT | RELAY 1 | RELAY 2 | TOTAL |
|---|---|---|---|
| $I_A$ | 4.79 A∠156.7° | 6.88 A∠ -19.10° | 2.132 A ∠ -90° |
| $I_B$ | 5.08 A∠37.5° | 5.08 A∠ -142.5° | 0 |
| $I_C$ | 5.08 A∠-82.5° | 5.08 A∠ 97.50° | 0 |
| $I_{AB}$ | | | 2.132 A ∠ -90° |
| $I_{BC}$ | | | 0 |
| $I_{CA}$ | | | 2.132 A ∠ 90° |
| $I_1$ | 4.98 A∠157.25° | 5.679 A ∠ -21.14° | 0.715 A ∠ -9.83° |
| $I_2$ | 0.099 A ∠ -9.72° | 0.610 A ∠ -9.72° | 0.620 A ∠ -9.72° |
| $I_3$ | 0.099 A ∠ -9.72° | 0.610 A ∠ -9.72° | 0.620 A ∠ -9.72° |

FIG.3B

| FAULT TYPE | $\angle I_{0TOTAL} - \angle I_{2TOTAL}$ |
|---|---|
| A-G, BG-G | $0° \pm 60°$ |
| B-G, CA-G | $-120° \pm 60°$ |
| C-G, AB-G | $120° \pm 60°$ |

FAULT TYPE SELECTION SYSTEM FOR IDENTIFYING FAULTS IN AN ELECTRIC POWER SYSTEM

TECHNICAL FIELD

This invention relates generally to a fault identification system useful in protective relays for an electric power system, and more specifically concerns such an identification system where electric current data measured and calculated by the protective relays at the ends of the power line are available to the other protective relays on the power line.

BACKGROUND OF THE INVENTION

One well-known system for determining the existence of faults on electric power lines is line current differential protection. In line current differential protection, protective relays are positioned at the respective ends (terminals) of the protected power line. A relay at one end of the line (e.g. the local relay) will use current values which it measures at its end of the line in combination with current values which are measured by relays at the other end or ends of the power lines (the remote relays) to produce fault determinations.

Specifically, for a two-terminal line which is protected by a line differential system, the protection arrangement requires current measurements by protective relays at both ends of the line. The protective relays at the respective ends of the lines exchange magnitude and phase angle information of the currents they measure by means of a separate communications channel, such as a fiber-optic line (or other means). In a typical arrangement, each relay is capable of making a decision to trip a circuit breaker for the power line based on the current values it measures and the current values it receives from the relay at the other end of the line. Each relay has an associated breaker on the line which it (the relay) protects.

In making a fault-type determination on the protected line (an internal fault), it is important to identify which phase or phases of the three-phase power system are involved. Proper identification of fault type is important in making correct and appropriate tripping actions. For instance, in a protective relay which includes a single pole trip capability, when only a single phase is faulted, i.e. when there is a single phase-(line) to-ground fault, the proper action of the protective relay is to trip only the single pole in the circuit breaker associated with the particular faulted phase.

It is also important for the protective relay to provide information concerning the faulted phase. The information includes relay front panel LEDs (light emitting diodes) which identify the faulted phase, generation of event reports and fault-type identification output signals from the relay. Fault-type identification is important for other reasons. If the relay includes reclosing capability, it is important to be able to distinguish multiphase faults from single line-to-ground faults, because the success rate for reclosing multiphase faults is very low. Still further, when fault types are accurately identified, those computing algorithms in microprocessor-based relays which are not relevant for the identified fault can be blocked, saving computation time for the overall system.

Existing fault-type selection or determination systems have certain disadvantages. Existing systems often have difficulty differentiating between single line ground (SLG) faults, phase-to-phase (PH-PH) faults and phase-to-phase to ground (PH-PH-G) faults over a wide range of system conditions. Second, existing systems often have difficulty providing an accurate identification of a fault during complex fault conditions, such as for simultaneous ground faults, i.e. ground faults which occur simultaneously on different phases on adjoining power lines. Still further, existing systems are often severely influenced by system non-homogeneity or load flow, which affects their overall accuracy to making fault-type determinations.

DISCLOSURE OF THE INVENTION

Accordingly, the invention is a system for fault-type identification which is used in a protective relay for an electric power system. The system uses three phase system information from the power line, the system comprising: a first circuit means which is responsive to individual protective elements which recognize the presence of single line to ground (single phase) faults for phases A, B and C on the power transmission line, the first circuit means including a portion thereof for recognizing and asserting output indications of single line to ground faults, faults involving two phases, and three phase faults, upon the occurrence of different combinations of outputs from the protective elements; a calculation circuit responsive to an enable signal for determining the angular difference between the total zero sequence current and the total negative sequence current with a three phase current on the power line, for identifying high resistance faults, when the angular difference is in one of three pre-selected angular difference sectors, wherein an angle difference in the first sector indicates an A phase to ground fault or a BC phase-to-phase to ground fault, wherein an angle difference in the second sector indicates a B phase to ground fault or a CA phase-to-phase to ground fault, and wherein an angle difference in the third sector indicates a C phase to ground fault or an AB phase-to-phase to ground fault, wherein angle differences identified in each of the three sectors are indicated by sector signals; and processing means for determining which of the two possible indicated by the determined angular differences responsible for the fault and for providing a signal indication of said fault type.

BRIEF DESCRIPTION OF THE DRAWINGS

FIG. 3 is a table showing current values for an internal SLG fault, such as the one in FIG. 1.

BEST MODE FOR CARRYING OUT THE INVENTION

In the system of the present invention, the angular difference between the total zero sequence line current ($I_{0T}$) and the total negative sequence line current ($I_{2T}$) is determined (the determination of sequence quantities, zero sequence ($I_0$), positive sequence ($I_1$) and negative sequence ($I_2$) is well known and routine in the art and therefore not discussed in detail here) and then compared against threshold values to identify the particular fault type, including the particular phase or phases ($I_A$, $I_B$, $I_C$), which are faulted. The term "total current" as used herein is defined as the vector sum of all the line terminal relays, i.e. the currents identified by protective relays at each end of the line for each phase or sequence quantity.

For a two-terminal line, protective relays will be positioned at opposing ends (terminals) of the protected line. When the relay at one end of the line (the local relay) makes a vector sum current determination, current values from the relay at the remote end of the line must be time-aligned with the current values measured by the local relay. Such alignment requirements and implementation are well known, and therefore are not discussed in detail herein.

Figure 1:
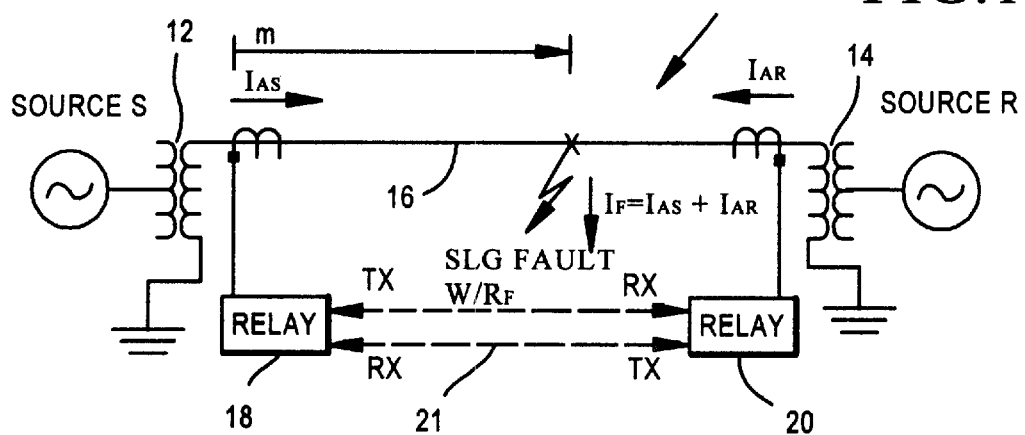
FIG. 1 is a diagram for an internal SLG fault on a single line.

FIG. 1 shows a two-terminal, two-source system 10, with local source S and remote source R and associated transformers 12 and 14, feeding a power line 16. A single phase-(line) to-ground (SLG) fault is illustrated as being located a per unit distance m from the location of a local relay 18. The power line system 10 includes local and remote relays 18 and 20 which are connected via a communication line 21. Circuit breakers 22 and 23 are associated with relays 18 and 20.

Figure 2:
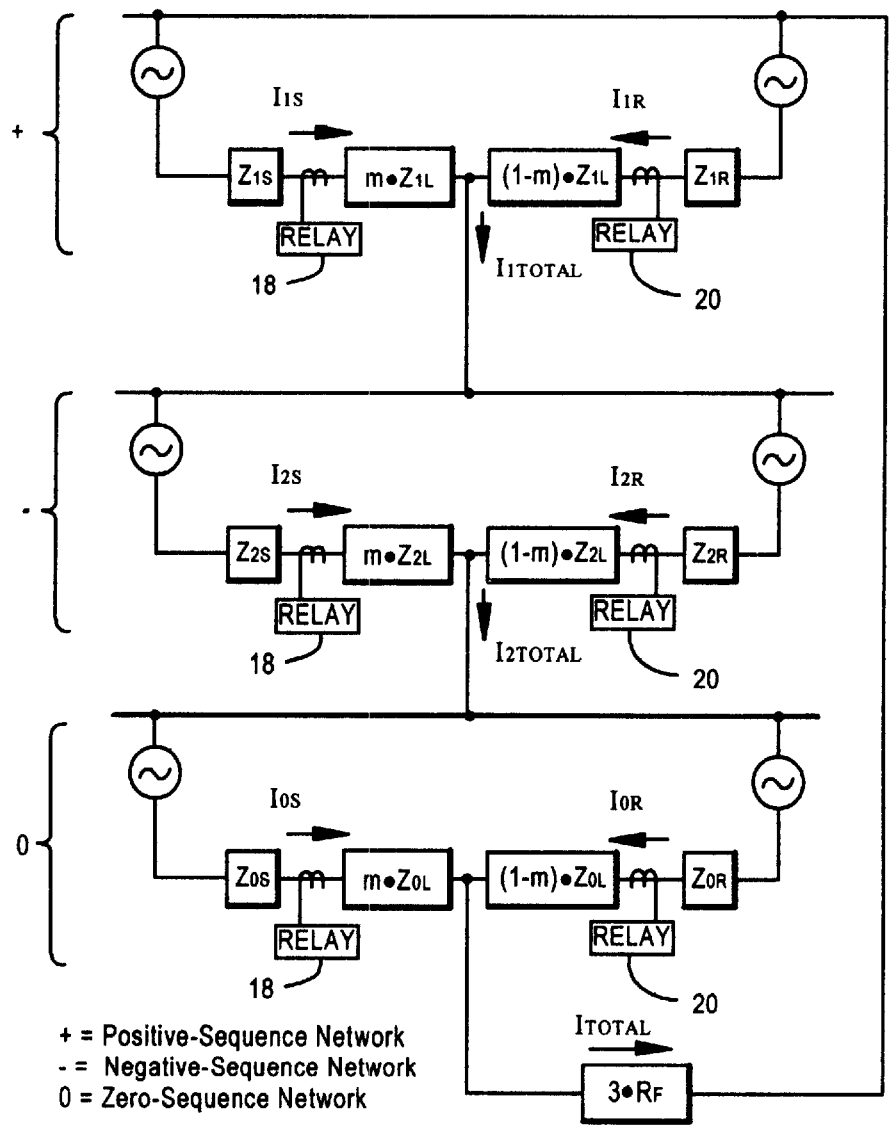
FIG. 2 a sequence connection diagram for an SLG fault of FIG. 1.

FIG. 2 shows the sequence connection diagram for the SLG fault of FIG. 1, i.e. the positive sequence, negative sequence and zero sequence impedance quantities ($Z_1$, $Z_2$ and $Z_0$). From FIG. 2, it is apparent that total zero sequence current $I_{0T}$) is equal to the total negative sequence current ($I_{2T}$), both in magnitude and angle. The angular difference between $I_{0T}$ and $I_{2T}$ is 0° for the single phase-to-ground fault, for the A phase to ground fault of FIGS. 1 and 2. The angular difference is the same regardless of the magnitude of the fault resistance ($R_F$) or the load flow. FIG. 3 lists the currents which are presented to the two relays and the calculated phase, phase-to-phase and sequence currents for the example of a single phase-to-ground fault (specifically A phase), for one case (FIG. 3a), where m=0.95, pre-fault load flow is zero and the fault resistance is 0 ohms, and for another case (FIG. 3b), where m=0.95, prefault load flow is 5.08 amps and the fault resistance is 30 ohms. In both cases, it is important to note that the phase pair which is not associated with the fault has the lowest current magnitude. This is significant for the present invention.

Figures 4, 5:
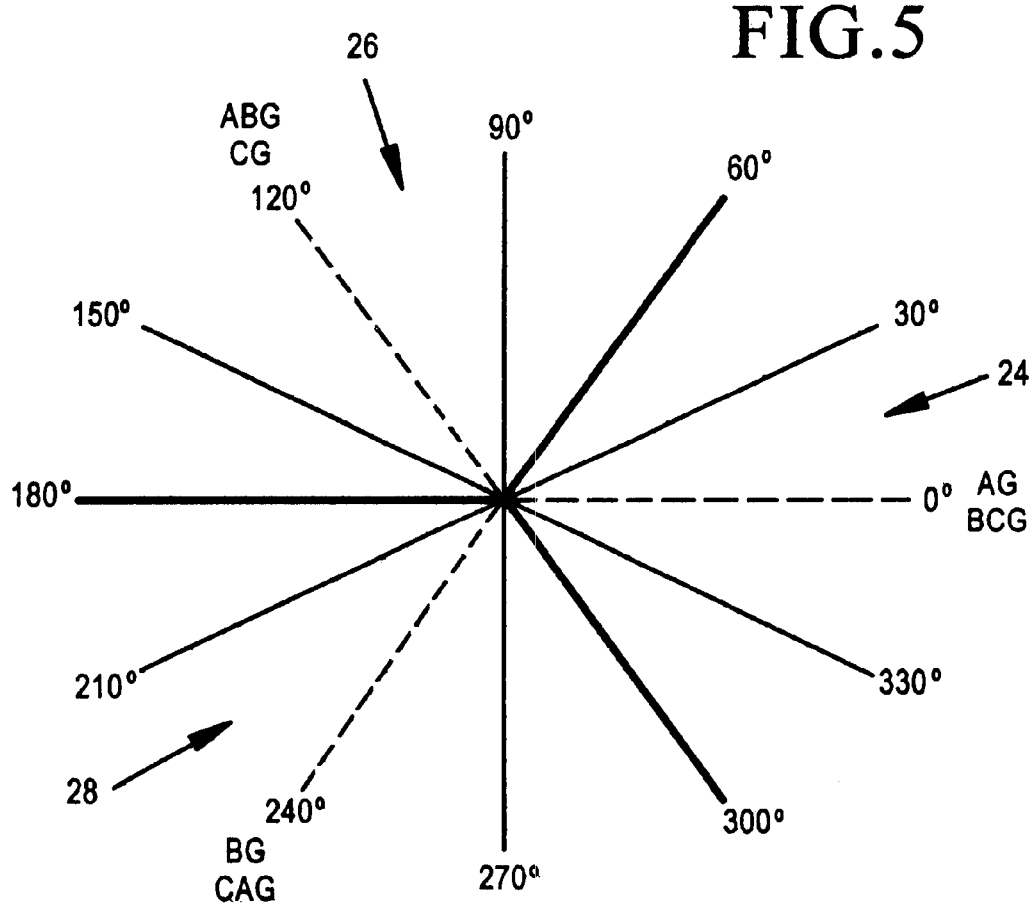
FIG. 4 is a table showing current angles for unbalanced.
FIG. 5 is a current angle sector diagram from FIG. 4.

FIG. 4 sets forth various unbalanced faults (phase to ground and phase-to-phase to ground) and their associated phase angle difference ($I_{0r}$–$I_{2r}$) ranges which result from those faults, for the system shown in FIG. 1. Note that each ±60° sector in FIG. 4 has two possible . FIG. 5 illustrates the three ±60° angular sectors (24, 26, 28), centered, respectively, about the ideal center angles of 60°, 120° and –120° (300°), in which the faults of FIG. 3 are located. The ±60° angle range about each center line accounts for distributed line capacitance, non-homogeneity and other system errors. Typically, however, the errors will not approach the 60° range limits.

As indicated from FIGS. 4 and 5, a phase angle difference in the first sector is the result of an A phase-to-ground or a BC phase-to-phase to ground fault. The BC phase-to-phase to ground fault possibility can, however, be eliminated if it is determined that the current IBC under those circumstances is not the largest phase-to-phase current (i.e. not the largest relative to $I_{AB}$ and $I_{CA}$). Thus, determining the angular difference between the total zero sequence current and the total negative sequence current, when there is a fault, results in an angle sector value which in turn indicates that the fault is one of only two different types associated uniquely with that particular angular sector. The three sectors include all the phase to ground and phase-to-phase to ground fault-type possibilities. Other current values are then analyzed by the circuit of the present invention to determine in each case which of the two possible fault-types is the true (actual) fault-type. An indication of the fault type is then made at the output of the circuit for further use by the protective relay as described in more detail below.

Figure 6:
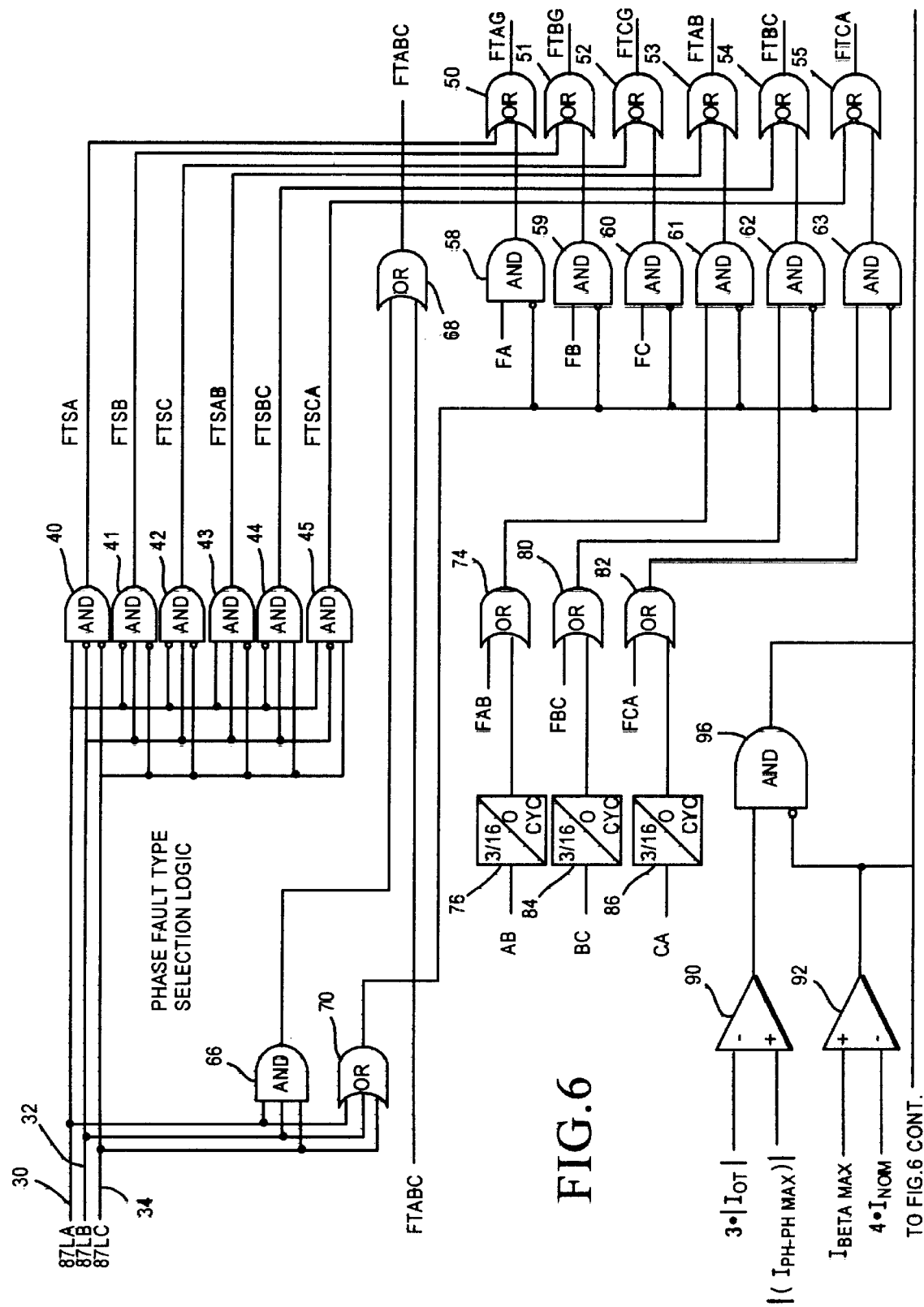
FIG. 6 is a logic circuit diagram for a portion of the system of the present invention.
Figure 6:
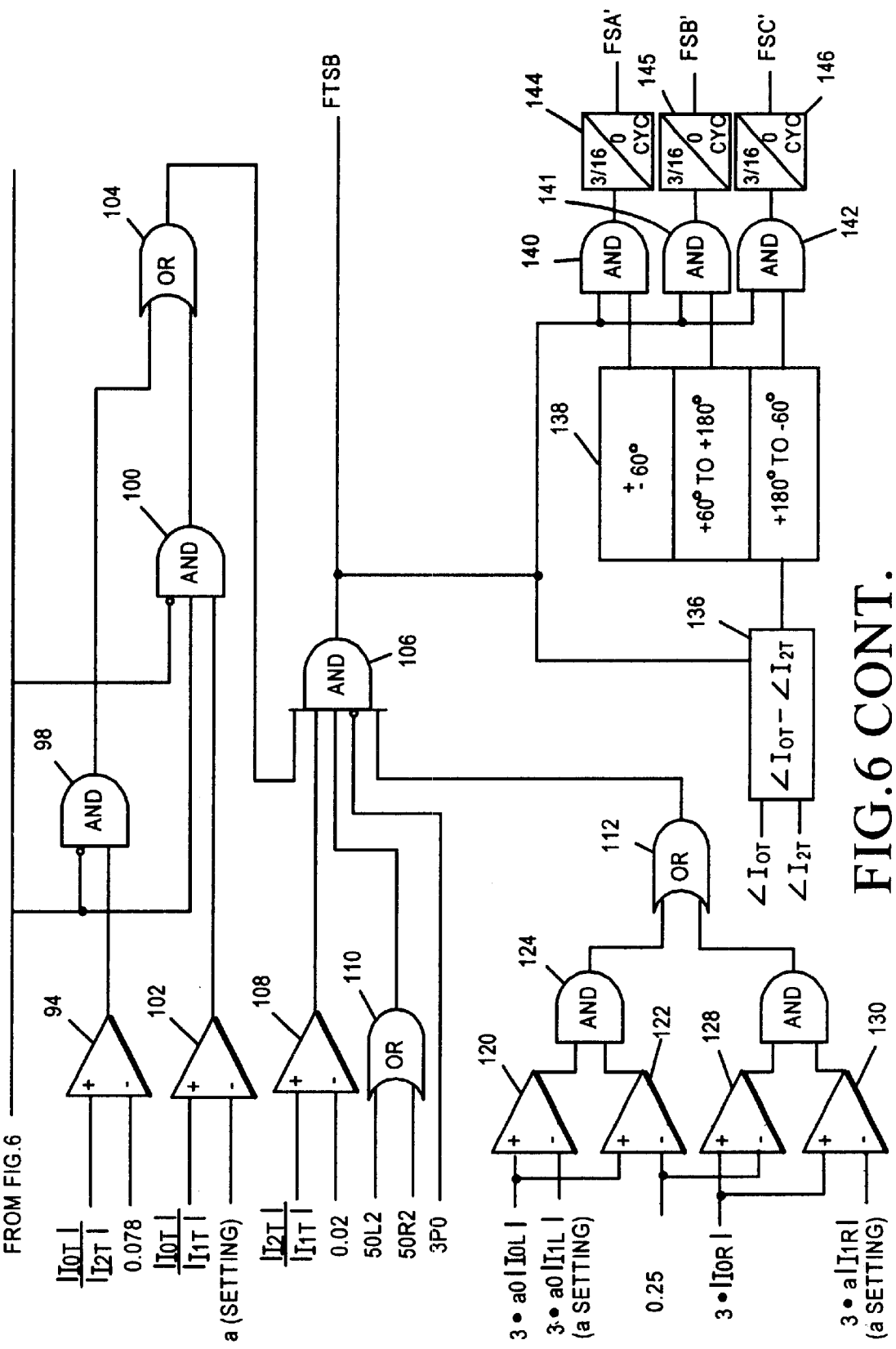

Referring now to FIG. 6, in the system of the present invention, three conventional single-phase protective elements (phase A, B and C) are included to provide input to a fault type logic circuit. These are shown as 87A, 87B and 87C signals. "87" is the industry designation for a differential protective element. The letter suffix after 87 indicates the monitored phase. In this application, single phase elements are identified but phase-to-phase elements could also be used. The single-phase assert, i.e. "pick up", when a fault associated with that particular phase occurs on the protected line. If only one of the three elements asserts, the fault type is an SLG fault associated with that element. If two of the three phase elements assert and the remaining phase element does not, the fault type is a phase-to-phase fault, between the phases of the two picked-up phases, e.g. if phase A and phase B elements assert, the fault is an AB phase-to-phase fault. If all three phase elements pick up, the fault is three phase.

The determination of a fault by the single phase elements, however, is only reliable if the fault impedance is low. As fault impedance increases, pick-up (or lack thereof) of the individual phase elements cannot be relied upon as an accurate determination of the existence of a fault, as the pickup thresholds are often set higher than the fault current which may be present during higher impedance ground faults, so that an actual fault may not be recognized by the individual phase elements. The present system is directed toward solving that problem, among others, in identifying fault type.

In the present invention, negative sequence and zero sequence angle determinations are used in addition to phase elements. If none of the phase elements pick up, and the angle determination circuitry is enabled, logic circuitry is enabled to identify the particular faulted phases. When the angle determination circuitry is enabled, the angle of both the zero sequence and negative sequence quantities is determined and the difference between the two is calculated. The difference angle is identified as being in one of the three sectors noted above (FIG. 5), and then the two possible are reduced to one by further processing, as discussed below. An output signal identifies the fault type. Hence, accurate fault type determination is made regardless of the magnitude of fault resistance, whether it be high or low, and also under a variety of power system conditions.

Referring now to FIG. 6, the conventional phase elements (87A, 87B, 87C) and their outputs are shown at 30, 32 and 34, indicating faults on those phases by producing high output signals. The outputs of the phase elements 30, 32 and 34 are applied as inputs to AND gates 40–45. At AND gate 40, the output of phase A element 30 is applied to a non-inverting input, while the outputs of phase B and phase C elements 32 and 34 are applied to inverting inputs. At AND gate 41, the output of B phase element 32 is applied to a non-inverting input, while the output of A phase and C phase elements 30 and 34 are applied to inverting inputs. At AND gate 42, the output of C phase element 34 is applied to an inverting input, while the outputs of A and B phase elements 30 and 32 are applied to non-inverting inputs.

The output of AND gate 40 will be high when the phase A element asserts (picks-up) and the phase B and C elements 32 and 34 do not assert. The output of AND gate 41 will be high when the phase B element 32 asserts, and the phase A and phase C elements 32 and 34 do not assert. The output of AND gate 42 will be high when C phase element 34 asserts, but A and B phase elements 30 and 32 do not assert. High outputs from AND gates 40, 41 and 42 indicate A, B and C phase single-line-to-ground faults, respectively.

At AND gate 43, the outputs of A phase and B phase elements 30 and 32 are applied to non-inverting inputs, while the output from C phase element 34 is applied to an inverting input. The output of AND gate 43 will be high when both phase elements 30 and 32 assert, but phase element 34 does not assert. A high output from AND gate 43 indicates either an AB phase-to-phase or an AB phase-to-phase to ground fault. At AND gate 44, the outputs of B and C phase elements 32 and 34 are applied to non-inverting inputs, while the output from A phase element 30 is applied to an inverting input. The output of AND gate 44 will be high when elements 32 and 34 assert, while phase element 30 does not assert. This high input indicates either a BC phase-to-phase fault or a BC phase-to-phase to ground fault. At AND gate 45, the outputs of A and C phase elements 30 and 34 are applied to non-inverting inputs, while the output of B phase element 32 is applied to an inverting input. The output of AND gate 45 will be high when phase elements 30 and 34 are asserted but phase element 32 is not asserted. A high output from AND gate 45 indicates a CA phase-to-phase fault or a CA phase-to-phase to ground fault.

The outputs of AND gates 40–45 are applied, respectively, to a series of output bit OR gates 50–55. The other inputs to OR gates 50–55, respectively, are the outputs of AND gates 58–63.

The outputs of phase elements (87LA, 87LB and 87LC) 30, 32 and 34 are also applied to an AND gate 66. The output of AND gate 66 is high when all three phase elements are asserted. A high output indicates a three-phase internal fault for the protected line. The output of AND gate 66 is applied at one input to OR gate 68. The other input to OR gate 68 is an input labeled FABC, which is a signal from the angle logic circuit (FIG. 7) which also is capable of determining a three-phase fault, as discussed below. The output of OR gate 68 is labeled FTABC. The FTABC signal is an output bit indicating a three-phase fault. A high output of FTABC may be used by the protective relay to block the operation of reclosing circuitry, since reclosing is usually ineffective for a three phase fault, and further can be used to illuminate the three-phase fault LED indicator on the front panel of the relay, as well as being used to indicate the fault type in the event summary report and event history, if desired.

The phase element outputs 30, 32 and 34 are also applied to an OR gate 70, the output of which is high when any of the phase elements 30, 32 and 34 pick-up. Otherwise, the output is low. As indicated above, the outputs of elements 30, 32 and 34 are reliable only when the fault resistance is low. The output of OR gate 70 is applied to inverting inputs of AND gates 58–63. The actual inputs thus will be high only when none of the outputs 30, 32 34 of the phase elements are asserted. This could be due to non-fault conditions or there may be a fault with high fault resistance. Applied to the non-inverting inputs of AND gates 58, 59 and 60, respectively, are signals FA, FB and FC from the angle logic circuitry of FIG. 7 described below.

The outputs of OR gates 50, 51 and 52 will be high, respectively, for the conditions where there is phase A, B or C to ground faults. These are low resistance fault determinations. These outputs can be used to control tripping, the reclosing circuitry, illuminate the A phase, B phase or C phase LEDs on the relay front panel and indicate the in the event report summary and history, if desired.

The other inputs to AND gates 61, 62 and 63, respectively, are the outputs of OR gates 74, 80 and 82. The inputs to OR gate 74 are a signal FAB from the angle logic circuit of FIG. 7 discussed below and the output of a timer 76. Timer 76 is a time-delayed pickup, instantaneous dropout timer, which is initiated by an AB signal which is a signal from the angle logic circuit of FIG. 7 discussed below. The FAB and the AB signals from the angle logic circuit are signals indicating that the angle circuit has determined a high resistance fault of AB phase-to-phase to ground or AB phase-to-phase. Either output produces a high output from OR gate 74 to AND gate 61 and then to OR gate 53 to produce an output bit which is used by the relay to control tripping, illuminate the A and B phase LEDs on the front panel and to indicate the fault type in the event summary and event history, if desired.

Similar circuit phase type indications are provided for BC phase-to-phase type faults, including phase-to-phase to ground (OR gate 80 and timer 84) and CA phase-to-phase type faults (OR gate 82 and timer 86). The outputs of OR gates 80 and 82 are applied, respectively, to AND gates 62 and 63. The timers 76, 84 and 86 are all delayed in pickup (three counts or 3/16 of a power cycle) for security. This pick-up delay could be varied, depending on the desired security.

The following description is directed toward the enablement of and the determination of the phase angle between the zero sequence and negative sequence values for follow-on determination of fault type for faults with high fault resistance.

Referring still to FIG. 6, comparator 90 has an input of the ratio of the magnitude of the scaled (factor of 3) total zero sequence line current from all line terminals ($3I_0$) and the magnitude of the maximum phase-to-phase line current. The other input is 0.3 (30%). Hence, when the ratio is less than 30%, the output of comparator 90 is high. In comparator 92, one input is the magnitude of the maximum phase-to-phase current and the other input is a threshold value of $4 \cdot I_{nom}$ where $I_{nom}$ is the nominal secondary current rating for the relay (typically 1 or 5 amps). Thus, the output of comparator 92 will be high when the magnitude of the maximum phase-to-phase current is four times greater than the nominal current, i.e. 20 amps for a 5 amp nominal relay. Comparator 94 has at one input the ratio of the magnitude of the total zero sequence line current ($I_{0T}$) and the magnitude of the total negative sequence line current ($I_{2T}$), and at the other input a threshold ratio value of 0.078. Hence, the output of comparator 94 will be high when the ratio is larger than 8%. This threshold value, however, can be varied.

The outputs of comparators 90 and 92 are applied to an AND gate 96. The output of AND gate 96 is high when the threshold comparisons of comparators 90 and 92 are both satisfied. The output of comparator 92 is also applied to an inverting input of AND gate 98. Applied to the other input to AND gate 98 is the output of comparator 94. The output of AND gate 98 will be high when the output of comparator 94 is high, meaning that the threshold comparison of comparator 94 has been satisfied, and further, that the maximum phase-to-phase current magnitude is less than four times the nominal secondary current value, as determined by comparator 92. The output of AND gate 98 should thus be high for all faults having a current magnitude which satisfies the threshold values which are set high enough to ensure that the currents can be sensed by the relay.

The output of AND gate 96 is applied to an inverting input of AND gate 100. The output of comparator 92 is also applied to a non-inverting input of AND gate 100. A third input to AND gate 100 is from comparator 102. One input to comparator 102 is the ratio of the magnitude of the total zero sequence line current ($I_{OT}$) to the magnitude of the total positive sequence line current ($I_{1T}$). The other input is a threshold value settable by the user. Typically, this setting value will be above the maximum current transformer imbalance value, which will range from 0–0.3 (0–30%), with a typical value of 0.03.

The output of AND gate 100 will thus be high for all high magnitude faults where the zero sequence current magnitude exceeds 3.0% of the maximum phase-to-phase current magnitude. This circuitry provides a safeguard against false outputs during high fault phase-to-phase faults, where one current transformer (CT) may saturate, which results in a false zero sequence current.

The output of AND gate 100 is applied to an OR gate 104. The output of OR gate 104 is high when either (or both) of the outputs of AND gates 98 and 100 are high. The output from OR gate 104 is applied as one input to AND gate 106, the output of which enables the difference angle determination circuit 136. A second input to AND gate 106 is from comparator 108. One input to comparator 108 is the ratio of the total negative sequence line current ($I_{2T}$) and the total positive sequence line current ($I_{1T}$). The other input is a threshold ratio value of 0.02. The output of comparator 108 will be high for all unbalanced faults. For three-phase faults or normal load, the output of this comparator will block the enabling of the angle logic circuit, as this ratio threshold of comparator 108 should not be satisfied for those conditions.

A third input to AND gate 106 is from OR gate 110. The inputs to OR gate 110 are the outputs from negative sequence current detectors for both local and remote negative sequence current. These are shown with industry designations 50L2 (local) and 50R2 (remote). A high output of OR gate 110 requires that at least one terminal have sufficient negative sequence current to be sensed by the relay. A fourth input to AND gate 106 is a signal indicating whether or not there is a three-pole (circuit breaker) open. If there is a three-pole open on the circuit breaker, a high signal will be applied to a non-inverting input of AND gate 106. This will block a high output from AND gate 106 and hence will block the enabling of the difference angle determining circuit. The last input to AND gate 106 is from OR gate 112. A high output of OR gate 112 indicates that the zero sequence currents at one or more terminals are of sufficient magnitude for the angle of the zero sequence current to be relied upon. The output of OR gate 112 is determined as follows.

A comparator 120 has one input which is the magnitude of the scaled total zero local sequence current from all terminals ($3 \cdot I_{OL}$); the other input is the scaled total local positive sequence current ($3 \cdot I_{1L}$) multiplied by a setting factor "a" determined by the user. Typically, this setting factor will be 0.02, with a possible range of 0–0.30. Comparator 120 will be high for phase-to-ground faults and phase-to-phase to ground faults but will be low for normal load, phase-to-phase and threephase faults.

Comparator 122 compares the total local zero sequence current against a threshold value of 0.25 amps, which is typically 5% of $I_{nom}$ for a 5 amp nominal relay. The purpose of comparator 122 is to ensure that there is sufficient zero sequence current for a reliable angle. The outputs of comparators 120 and 122 are applied as inputs to an AND gate 124, the output of which is high when the outputs of comparators 120 and 122 are high, indicating that the stated thresholds involving zero sequence and positive sequence current ratios have been satisfied.

Comparators 128 and 130 and AND gate 134 provide similar functions for the total remote terminal zero sequence and positive sequence currents. The outputs of AND gates 124 and 132 are then applied to OR gate 112, the output of which, as indicated, is the fifth input to AND gate 106. A high output of OR gate 112 requires that either or both outputs of AND gates 124 and 134 be high.

A high output from AND gate 106 indicates that all of the threshold requirements for operation of the angle determination circuitry have been satisfied specifically that the outputs of OR gates 108 and 110 are both high, as well as the output of OR gate 104, that there is not a three-pole open in the circuit breaker, and finally that OR gate 112 is high. These threshold security determinations basically confirm that the angle to be determined can be relied upon.

The output of AND gate 106 is an FTSE signal (an output bit indicating that the fault logic has been enabled), which serves as an enable signal applied to difference angle determination circuit 136. In difference angle determination circuit 136, the resulting angle value is the angular difference between the total zero sequence current and the total negative sequence current. The angle from circuit 136 will always be within one of the three angle sectors shown in FIG. 5. These three sectors again are: 0°±60°, 120°±60° and −120° (240°)±60°. The outputs of the three sector block 138 are applied to AND gates 140, 141 and 142, along with the enable signal from AND gate 106. The outputs of AND gates 140–142 are applied to timers 144, 145 and 146. The output of timer 144 is an FSA' signal, indicating that the difference angle is within the first sector of 0°±60°; the output from timer from 145 is an FSB' signal, indicating that the angle is within the second sector, and the third signal FSC' from timer 146 indicates that the angle is within the third sector.

Although not shown specifically in FIG. 6, additional supervision over the fault selection logic of FIG. 6 can be made. One additional supervision action determines that the fault is internal as indicated by the unbalanced fault determination elements. If neither of these elements is picked up, then the difference angle calculation element 136 is not enabled. Further, if the magnitude of either the scaled (factor of 3) total zero sequence ($3I_{OT}$) or negative sequence ($3I_{2T}$) currents are below 0.25 amps secondary, then the difference angle calculator 136 is also not enabled. This establishes the minimum fault resistance ($R_F$) sensitivity of approximately 265 ohms.

Figure 7:
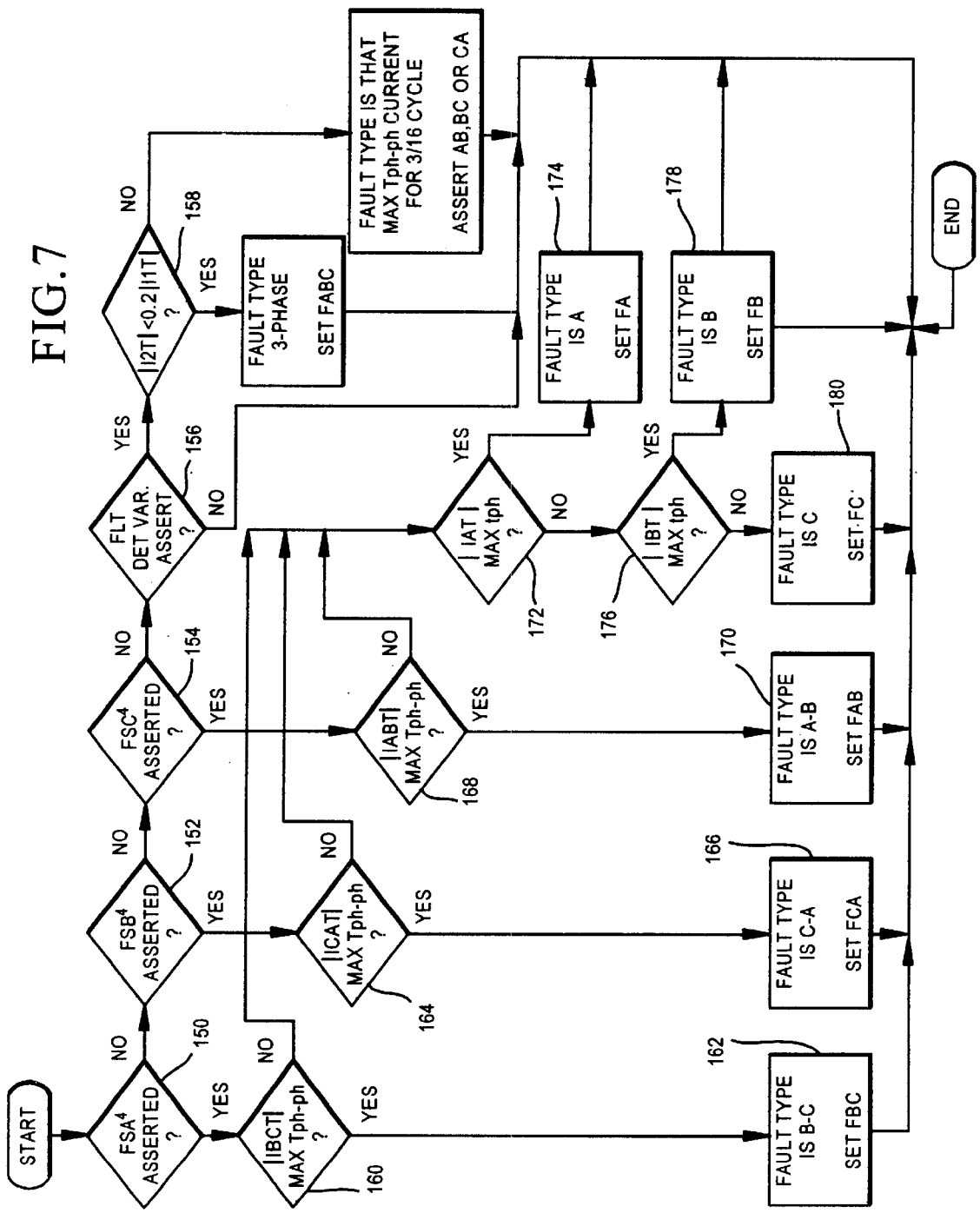
FIG. 7 is a logic diagram for the remainder of the system of the present invention.

The FSA', FSB' and FSC' signals discussed above (from timers 144, 145 and 146) are applied to the supplemental (angle) logic circuit of FIG. 7. The logic circuit of FIG. 7 does not operate if any of the individual phase elements (87LA, 87LB, 87LC) assert, which indicates the presence of a low resistance fault, for which the circuit of FIG. 7 is not necessary to provide fault identification. The circuit of FIG. 7 is a processing routine which continuously examines the outputs of timers 144, 145 and 146. In block 150, a determination is made as to whether or not the FSA' bit has been asserted. If the FSA' bit is asserted, the fault type, as indicated above, is an A phase to ground fault or a BC phase-to-phase to ground fault. If the FSA' bit has not been asserted, then a determination is made as to whether or not the FSB' bit has been asserted, as shown in block 152. If this bit has been asserted, then the fault is either a B phase to ground fault or a CA phase-to-phase to ground fault. If FSB' has not asserted, then the FSC' bit is checked, at block 154, to determine whether that relay bit has been asserted. If that bit has been asserted, the fault is either a C phase-to-ground or an AB phase-to-phase to ground fault.

If the FSC' bit has not been asserted (FSA', FSB' and FSC' all not asserted), the next check is to determine the fault type for unbalanced faults which do not involve ground, i.e. AB, BC and CA (block 156). If this fault detection variable is picked up, then the next step is to decipher whether or not the variable is picked up due to errant negative-sequence current. If the detection variable block does not assert, then the routine proceeds to the end.

If an unbalanced fault is, however, detected by block 156, the ratio of the magnitude of the total negative sequence current ($I_{2T}$) to the magnitude of the total positive sequence current ($I_{1T}$) is checked against a threshold of 20% (block 158). If the ratio is less than 20%, then the fault is determined to be three-phase and the logic asserts an FABC output fault-type indication, which is applied back to the circuit of FIG. 6, as an output to OR gate 68. The output of OR gate 68, as explained above, sets an output bit indicative of a three-phase fault.

If the ratio is greater than 20%, the fault-type is identified by determining the maximum phase-to-phase current magnitude, either AB, BC or CA (depending on which phase-to-phase current magnitude is the greatest at that point). The ratio check of block 158 must be true for at least 3/16 of a cycle for the fault type to be asserted. The 3/16 of a cycle delay is provided by timers 76, 84 or 86 (FIG. 6), and can be varied. This is explained above relative to the output bits ultimately asserted at the output of OR gates 53, 54 or 55. These outputs again signify the fault type.

Going back to block 150, if the FSA' bit is asserted, then the fault type, as indicated above, could be either an A phase to ground or a B phase-to-C phase to ground fault. For an AG fault, IBc, as indicated above, will have the least total phase current among the three possible phase-phase currents, because the B-C phase pair is not involved in an AG fault. A comparison is thus made at block 160 to determine whether $I_{BC}$ has the maximum phase-to-phase current. If $I_{BC}$ is the maximum phase-to-phase current, the fault type must be a BC phase-to-phase to ground fault. That fault type is then set at block 162 and an FBC bit is set for application to OR gate 80 in FIG. 6. The output for the fault type is through OR gate 54 for the BC fault type.

Similar functions are provided by blocks 164 and 166 when the FSB' bit is asserted. For the FSB' bit, when IA has the maximum phase-to-phase current value among the three-phase current values, the fault type is identified as CA phase-to-phase to ground and an FCA' bit is established at block 166 and applied to OR gate 82 in FIG. 6. This will ultimately result in OR gate 53 providing an output bit indicative of a fault involving phases C and A. When an FSC' bit has been asserted and $I_{AB}$ is the maximum phase-to-phase current, as determined by block 168, the fault type is recognized to be AB phase-to-phase to ground and the bit FAB is set at 170 and applied to OR gate 74 in FIG. 6. This will ultimately result in output OR gate 53 providing an output bit indicative of a fault involving phases A and B as discussed above.

When the outputs of any of blocks 160, 164 and 168 are NO, the high outputs on those lines are applied to a block 172, which first determines whether the total A phase current is the maximum current. If it is YES, the fault type is indicated to be an A phase-to-ground fault and an FA bit is set, at block 174, for application back to FIG. 6, specifically AND gate 58, and ultimately output OR gate 50. If the total B phase current is maximum (block 176), then an FB bit is set at block 178 and applied back to FIG. 6 to AND gate 59 and output OR gate 51. If neither A phase or B phase current is maximum, then the FC bit is set, at block 180, which is applied back to FIG. 6 to AND gate 60 and then output gate 52. In operation, blocks 172 and 176 are not necessary but included for additional protection and ultimate simplicity of operation.

The output bits from blocks 162, 166, 170, 174, 178 and 180 are used by the logic circuit of FIG. 6 to indicate fault types which involve high resistance faults, from output OR gates 50–55. Those bit outputs are used to control tripping, reclosers, panel LEDs and event reports, as well as fault processing circuitry. The conventional 87A, 87B and 87C elements are used to provide the bit outputs through OR gates 50–55 when low resistance faults are involved.

In a modification of the system of FIG. 6, the phase elements 87LA, 87LB and 87LC could in effect be replaced by sequence quantity element(s) (e.g. a positive sequence element). In such a modified system, the FTAG, FTBG and FTCG outputs in FIG. 6 are supplied by the FA, FB and FC signals from FIG. 7 and the FTAB, FTBC and FTCA outputs in FIG. 6 are provided directly from OR gates 74, 80 and 82, which are responsive to the inputs shown in FIG. 6. AND gates 40–45 and 58–63 and OR gates 50–55 are eliminated in this arrangement. The process routine of FIG. 7 is started by an indication of the existence of a fault condition by action of a sequence element. The remaining circuitry of FIGS. 6 and 7 then determines the fault type as explained above.

Although a preferred embodiment of the invention has been disclosed here for purposes of illustration, it should be understood that various changes, modifications and substitutions may be incorporated without departing from the spirit of the invention, which is defined by the claims which follow.

What is claimed is:

1. A system for fault type identification in an electric power system, using three-phase current information on the power line, comprising:

a first circuit means responsive to protective elements which recognize the presence of single line-to-ground (SLG) faults for phases A, B and C on a power transmission line, the first circuit means including a portion thereof for recognizing and asserting output indications of single line-to-ground faults, faults involving two phases and three-phase faults, in response to the occurrence of different combinations of outputs from the protective elements;

a calculation circuit, responsive to an enable signal generated upon the determination of the existence of selected threshold current conditions on the line, for determining the angular difference between the total zero sequence current and the total negative sequence current for the three-phase current on the power line, for identifying high resistance faults, wherein the angular difference is in one of three pre-selected angular difference sectors, wherein an angle difference in the first sector indicates an A phase to ground fault or a BC phase-to-phase to ground fault, wherein an angle difference in the second sector indicates a B phase to ground fault or a CA phase-to-phase to ground fault, and where an angle difference in the third sector indicates a C phase to ground fault or an AB phase-to-phase to ground fault angle differences in each of the three sectors being indicated by sector signals; and processing means for determining which of the two possible fault types indicated by the determined angular difference is the actual fault type and for providing a signal indication of said actual fault type.

2. The system of claim 1, wherein the first sector covers an angle difference range of ±60° about a 0° center, wherein the second sector covers an angle difference range of ±60° about a 120° center, and wherein the third sector covers an angle difference of ±60° about a −120° center.

3. The system of claim 2 wherein if a first sector signal is asserted and the BC phase-to-phase current ($I_{BC}$) is the maximum phase-to-phase current, the fault type is asserted as a BC phase-to-phase to ground fault, otherwise the fault is asserted as an A phase-to-ground fault; wherein if a third sector signal is asserted and the CA phase-to-phase current ($I_{CA}$) is the maximum phase-to-phase current, the fault type is asserted as a CA phase-to-phase to ground fault, otherwise the fault is asserted as a B phase-to-ground fault; and wherein if the second sector signal is asserted and the AB phase current ($I_{AB}$) is the maximum phase-to-phase current, the fault type is asserted as an AB phase-to-phase to ground fault, otherwise, a C phase-to-ground fault is asserted.

4. The system of claim 1, wherein the processing means assert s a three-phase fault and provides an output indication thereof in the event that none of the sector signals are present and the total negative sequence current is less than a selected fraction of the total positive sequence current.

5. The system of claim 3, wherein the selected fraction is ⅕.

6. The system of claim 1, wherein a three-phase fault is asserted by said first circuit means when all three protective elements assert, indicating a fault on all three phases.

7. The system of claim 1, including means for transmitting the signal indications of fault type produced by the processing means to the first circuit means which is responsive thereto and to the protective elements to produce said output indications of fault type.

8. The system of claim 1, including a first timer means for delaying the assertion of the sector signals.

9. The system of claim 8, wherein the delay is 3/16 of a power system cycle.

10. The system of claim 1, including an enable circuit for the calculation circuit, the enable circuit including a plurality of threshold determinations which must be satisfied prior to the calculation circuit being enabled.

11. The system of claim 10, wherein one threshold is the presence of a selected minimum amount of negative sequence current.

12. The system of claim 10, wherein one threshold is a selected minimum ratio of zero sequence current to negative sequence current, in combination with a selected minimum value of zero sequence current.

13. The system of claim 10, wherein one threshold is a selected minimum ratio of total negative sequence current to total positive sequence current.

14. The system of claim 13, wherein the minimum ratio is 0.02.

15. The system of claim 10, wherein one threshold is the combination of: 1) the ratio of total zero sequence current to total positive sequence current is greater than 0.03; (2) the maximum phase-to-phase current is greater than four times the nominal secondary current; and (3) the ratio of the total zero sequence current over the maximum phase-to-phase current is less than 0.3.

16. The system of claim 15, wherein another threshold includes: (1) the ratio of the total zero sequence current to the total negative sequence current is greater than 0.078 and (2) the maximum phase-to-phase current is less than four times the nominal secondary current.

17. The system of claim 1, wherein the processing means asserts a phase-to-phase fault type indication (AB, BC, CA) for the maximum phase-to-phase current value when none of the sector signals are asserted and the total negative sequence current is larger than a selected fraction of the total positive sequence current.

18. The system of claim 17, including second timers for delaying said assertion of said phase-to-phase faults identified by the processing means, the delay being 3/16 of a power system cycle.

19. A system for fault type identification useful in a protective relay for an electric power system, using three phase current information from the power line, comprising:

a first circuit means responsive to protective elements which recognize the presence of single phase to ground faults for phases A, B and C on the power line, the first circuit means including a portion thereof for recognizing and then asserting output indications of single phase to ground faults; faults involving two phases, and three phase faults, in response to the currents of different combinations of outputs from the protective elements;

a calculation circuit, responsive to an enable signal generated upon the determination of the existence of selected threshold current conditions on the line, for determining the angular difference between the total zero sequence current and the total negative sequence for the three phase current on the power line, for identifying high resistance faults, wherein the angular difference is in one of three angular difference sectors, wherein an angular difference in a first sector indicates first and second possible fault types, wherein an angle difference in the second sector indicates third and fourth possible fault types, and wherein an angle difference in the third sector indicates fifth and sixth possible fault types; and processing means for determining which of the two possible fault types in each sector is the actual fault type and providing a signal indication of said actual fault type.

20. A system for fault type identification useful in a protective relay for an electric power system, using three phase current information from the power line, comprising:

a calculation circuit, responsive to an enable signal generated upon the determination of the existence of selected threshold current conditions on the line, for determining the angular difference between the total zero sequence current and the total negative sequence for the three phase current on the power line, wherein the angular difference is in one of three angular difference sectors, wherein an angular difference in a first sector indicates first and second possible fault types , wherein an angle difference in the second sector indicates third and fourth possible fault types, and wherein an angle difference in the third sector indicates fifth and sixth possible fault types; and processing means for determining which of the two possible fault types in each sector is the actual fault type and providing a signal indication of said actual fault type, the processing means being responsive to a protective element recognizing the existence of a fault condition, the processing means having the capability of identifying phase-to-phase fault types, which are not part of the first through sixth fault types and which do not involve ground.

21. The system of claim 20, wherein the first and second fault types are A phase to ground and BC phase-to-phase to ground, wherein the third and fourth possible fault types are B phase to ground and CA phase-to-phase to ground and wherein the fifth and sixth fault types are C phase to ground and AB phase-to-phase to ground.

* * * * *